United States Patent [19]

Tavallaei et al.

[11] Patent Number: 5,909,584
[45] Date of Patent: Jun. 1, 1999

[54] POWER INTERLOCK WITH FAULT INDICATORS FOR COMPUTER SYSTEM

[75] Inventors: Siamak Tavallaei, Spring; Robert F. Olson, The Woodlands, both of Tex.

[73] Assignee: Compaq Computer Corp., Houston, Tex.

[21] Appl. No.: 08/911,250

[22] Filed: Aug. 15, 1997

[51] Int. Cl.[6] .............................. G06F 1/26; G06F 13/00; H01H 9/20

[52] U.S. Cl. ................... 395/750.01; 395/282; 361/785; 307/140

[58] Field of Search .............................. 395/750.01, 282, 395/283; 361/785; 307/140, 147

[56] References Cited

U.S. PATENT DOCUMENTS

| | | | |
|---|---|---|---|
| 5,070,529 | 12/1991 | Beaufort et al. | 361/798 |
| 5,293,636 | 3/1994 | Bunton et al. | 395/284 |
| 5,526,289 | 6/1996 | Dinh et al. | 364/557 |
| 5,555,510 | 9/1996 | Verseput et al. | 395/282 |
| 5,574,667 | 11/1996 | Dinh et al. | 364/557 |
| 5,613,130 | 3/1997 | Teng et al. | 395/750.01 |
| 5,625,238 | 4/1997 | Ady et al. | 307/147 |
| 5,631,800 | 5/1997 | Jin et al. | 361/103 |
| 5,634,038 | 5/1997 | Saitoh | 395/490 |
| 5,638,895 | 6/1997 | Dodson | 165/121 |
| 5,796,185 | 8/1998 | Takata et al. | 307/140 |
| 5,805,903 | 9/1998 | Elkhoury | 395/750.01 |

OTHER PUBLICATIONS

The I²C-Bus and how to use it (including specification); *Philips Semiconductor*; Apr. 1995; pp. 1–24.

"Remote 8-bit I/O expander for I²C-Bus" Data Sheet; *Philips Semiconductor*; Apr. 2, 1997; pp. 1–3.

Farnswolrth, C.; "Low Power Implementation of an I²C-Bus Expander", http://maveric0.uwaterloo.ca/amulet/publications/thesis farnsworth94_msc.html; Jun. 16, 1997; one page.

Collins, Andy; "Interfacing TMS370 Microcontrollers to I²C-Bus ICs", Logikos; wysiwyg://lll/http://www,logikos.com/tms370.html; Jun. 16, 1997; pp. 1–6.

"I²C-Bus Expander" Application Note AN036; *Philips Semiconductors Programmable Logic Devices*; Oct., 1993; 22 pages.

"The PCI (Peripheral Component Interconnect) Bus"; Aug. 6, 1997; pci.txt at www.gl.umbc.edu; pp. 1–7.

Barton, Jim; "Re: What's the difference between locks and semaphores?"; (jmb@patton.wpd.sgi.com) Jan. 2, 1991; Acessed Jun. 16, 1997; http://www.sgi.com/Archive/comp.sys.sgi/1991/Jan/0006.html.

"Internal Data Structures, 6.4.3 Semaphores" Basic Concepts; Accessed Jul. 11, 1997; http://linux.www.db.erau.edu/LPG/node47.html.

"The PCI Local Bus"; Accessed Jul. 27, 1997; http://www.rns.com/whats new/wh pci.html.

"PCI Bus Technology" Information Brief; *IBM Personal Computing Solutions*; Acessed Jul. 27, 1997; http://www.us.pc.ibm.com/infobrf/ibpci.html.

"PCI164 Screamer Functional Diagram" Microway; Accessed Jul. 27, 1997; http//www.microway.com/block.html.

"The PCI (Peripheral Component Interconnect) Local Bus" description of PCI Bus; Accessed Jul. 27, 1997; http://www.sundance.com/pci.html.

"CMOS Bus Switches Provide Zero Delay Bus Communication" Application Note AN-09; *Quality Semiconductor Inc.*; date unknown; pp. 1–9.

"High-Performance CMOS Analog 8-Channel Switch" QS4A05Q Preliminary; *Quality Semiconductor Inc.*; May 30, 1996; pp. 1–7.

"Quickswitch® Converts TTL Logic to Hot Plug Operation" Application Note AN-13; *Quality Semiconductor Inc.*; date unknown; pp. 1–5.

*Primary Examiner*—Gopal C. Ray
*Attorney, Agent, or Firm*—Jenkens & Gilchrist

[57] ABSTRACT

The invention relates to a computer system having a chassis with an access door allowing a user to access the computer circuitry. The computer circuitry has a plurality of critical circuit boards and an interlock circuit routed through connectors and cables associated with the critical circuitry. If any of the connectors are not connected or connected improperly the main power is prevented from turning on or the main power to the computer is turned off and auxiliary power is used to power indicator lights which aid a user determine which connector is not connected or improperly connected.

13 Claims, 4 Drawing Sheets

POWER INTERLOCK WITH FAULT INDICATORS FOR COMPUTER SYSTEM

BACKGROUND OF THE INVENTION

1. Field of the Invention

The present invention relates to a computer system incorporating a serial circuit routed through various connectors in the computer system that will inhibit a power supply from providing main power to the computer system circuits if any of the various connectors are not connected properly. Furthermore, the present invention provides indicator lights to aid a person servicing the computer system in determining which connector is not seated properly.

2. Description of the Related Art

Networks serve the purpose of connecting many different personal computers, workstations, or terminals to each other, and to host computers, printers, file servers etc., so that expensive computing assets, programs, files and other data may be shared among many users.

In a network utilizing a client/server architecture, the client (a personal computer or workstation) is the requesting machine and the server is the supplying machine, both of which are connected via the network. The network can be a local area network (LAN) or a wide area network (WAN). This is in contrast to early network systems that utilized a mainframe with dedicated terminals.

In a client/server network, the client contains the user interface. The user interface may perform some or all of the application processing and, as mentioned above, the user interface can include a personal computer or a workstation. The server in a client/server network can be a high-speed microcomputer or minicomputer and, in the case of a high-end server, can include multiple processors and mass data storage devices. The mass storage devices could include multiple hard drives and multiple CD-ROM drives. A database server maintains the databases and processes requests from the client to extract data from or update the databases. An application server provides additional business processing for the clients. The network operating system (NOS) together with the database management system (DBMS) and transaction monitor (TP monitor) are responsible for the integrity and security of the server. Client/server networks are widely used throughout many different industries and business organizations. The mass storage and multi-processing capabilities provided by current client/server network systems (i.e., high-end servers) permit a wide range of essential services and functions to be provided through its use.

As can be appreciated, many businesses are highly dependent upon the availability of their client/server network systems. The client/server networks permit essential network services and functions to be carried out. As these client/server network systems become increasingly essential to everyday operations of businesses, additional steps should be taken in the design and construction of the server in the client/server network system to ensure continuous availability to the clients. In other words, the design and construction of a server should include elements that ensure that the server can be operated with little or no down time.

Server reliability and serviceability are two valuable design requirements help ensure that a server will operate with little or no down time. The modularity of components within a server is recognized as an important design consideration. Modularity ensures that the down time of a server will be minimized. Modules can be removed and examined for operability or other purposes. Removal of modules is much easier and less time consuming than permanently mounted fixtures within a server chassis. When various components of a server are in a modular form, they can also be readily replaced to maintain the operational status of the server.

Removable modular components include disc drives, power supplies fans, and memory boards. As referenced above, the removability of modular components allows for better overall serviceability of the computer system which is a distinct advantage. For example, a defective power supply in the server generally requires prompt replacement in order to limit downtime. Modular components and connectors facilitate prompt replacement and are thus popular in many computer designs.

Originally, a rule of practice in the maintenance of modular components or printed circuit boards of a server was that of always turning the power to the server off before any modular components or printed circuit boards were removed or added from the chassis or support frame of the server. Recent innovations have addressed the desirability to insert and remove modular components and printed cards from the chassis of the server when the server is electrically connected and operational. These innovations include "hot-pluggable" components which can be plugged into a computer system that is electrically connected and operational.

Hot-pluggable components today include storage or disc drives, drive cages, fans, power supplies, system I/O boards, control boards, processor boards, and other subassemblies. The hot removability of these server components allows for better overall serviceability of the computer system, which is a distinct advantage to both the user and the maintenance technician.

Component redundancy has also been recognized as an important design consideration when designing a server that will operate with little or no down time. Component redundancy is sometimes provided to better ensure that at least one of the redundant components is operable. With component redundancy, at least two components are provided that can perform the same function. If one of the redundant components fails, the operation switches over to the other redundant component. When at least one of the redundant components is operable, continued operation of the computer system is possible. To further enhance reliability and serviceability, redundant components have been made hot-pluggable.

Reconfiguration of the server system can also be accomplished with upgradable modular components. This can be accomplished by the addition or substitution of components having different circuits disposed thereupon. When components are redundant and hot-pluggable, reconfiguration of the server is often possible without taking the server offline.

Another important design aspect with redundant and hot-pluggable components is to ensure and maintain a safe working environment while the server is operating and being repaired or upgraded. Therefore the exposure of hot connectors and contacts should be kept to a minimum.

Steps are similarly taken in the design and construction of the server system to ensure that the server system is readily serviceable such that when the client/server network system must be serviced the down time can thereby be minimized. In existing client/server network systems it is often difficult to obtain important data corresponding to a component failure in order to facilitate the quick serviceability of the server. Therefore, the more information that can be readily provided to a user to locate a defective component or problem with the server minimizes the amount of time that the server is down can be minimized.

A computer server is an exemplary computer system. A computer server is typically utilized when a group of discretely-positioned computer systems are connected together in a networked fashion. The computer server, and files contained therein, is selectively accessible by any of the computers in the networked connection with the computer server. When access to the files stored at the computer server is essential to perform a particular service or function, it is imperative that the computer servers be online and available so that the files stored therein can be accessed.

A user interface for a computer system provides selected information relating to the computer system in human perceptible form to a user of the computer system. A user interface sometimes also permits a user of the computer system to input commands to the computer system. A computer keyboard and a video display terminal are exemplary of the user interfaces conventionally used in conjunction with a computer system.

In a computer system, such as a network server computer, a variety of circuit cards and system components are installed. Many of the circuit cards (circuit boards) have edge connectors that plug into a backplane or connectors attached to other circuit cards. Cables are connected between various components and from circuit card to circuit card. One or more power supplies provide power to the various components throughout the computer system.

In a computer server where multiple circuit cards and multiple connections are made from component to component it is critical that all the connections are properly made so that voltage, current and data signals are routed properly. Furthermore, if a circuit card or connector is not properly connected to a connector, it would be advantageous for there to be indicators within the computer system to aid a user to determine which connection is faulty.

In a large computer system, the current required to operate the multitudes of circuitry can be large and dangerous if misdirected. Thus, there is a need for an apparatus to aid a user in making sure that all crucial circuit boards are connected properly. Furthermore, if a crucial circuit board or cable is not connected properly, there is a need for circuitry that will turn off the main power to the computer and also aid a person servicing the computer to determine where the improper connection is made so that serviceability is made simpler and down-time of the computer is minimized.

SUMMARY OF THE INVENTION

The present invention helps simplify the serviceability, minimize the down-time, increase reliability and help protect against unnecessary damage to circuitry of a computer system. These and other aspects of the present invention are achieved by providing a power supply that is controlled, in part, by a control circuit. The control circuit includes a serial connection that is routed through various critical connectors in the computer system. If the serial connection is "open" (open circuited) at any location, the control circuit will detect the open circuit and not allow the main power from the power supply to turn on. Furthermore, an indicator light or lights associated with the control circuit and located within the computer near the crucial connections aides a user to determine which critical connection is not connected properly.

BRIEF DESCRIPTION OF THE DRAWINGS

Other objects, advantages, and novel features of the present invention can be understood and appreciated by reference to the following detailed description of the invention, taken in conjunction with the accompanying drawings in which.

Figure 1:
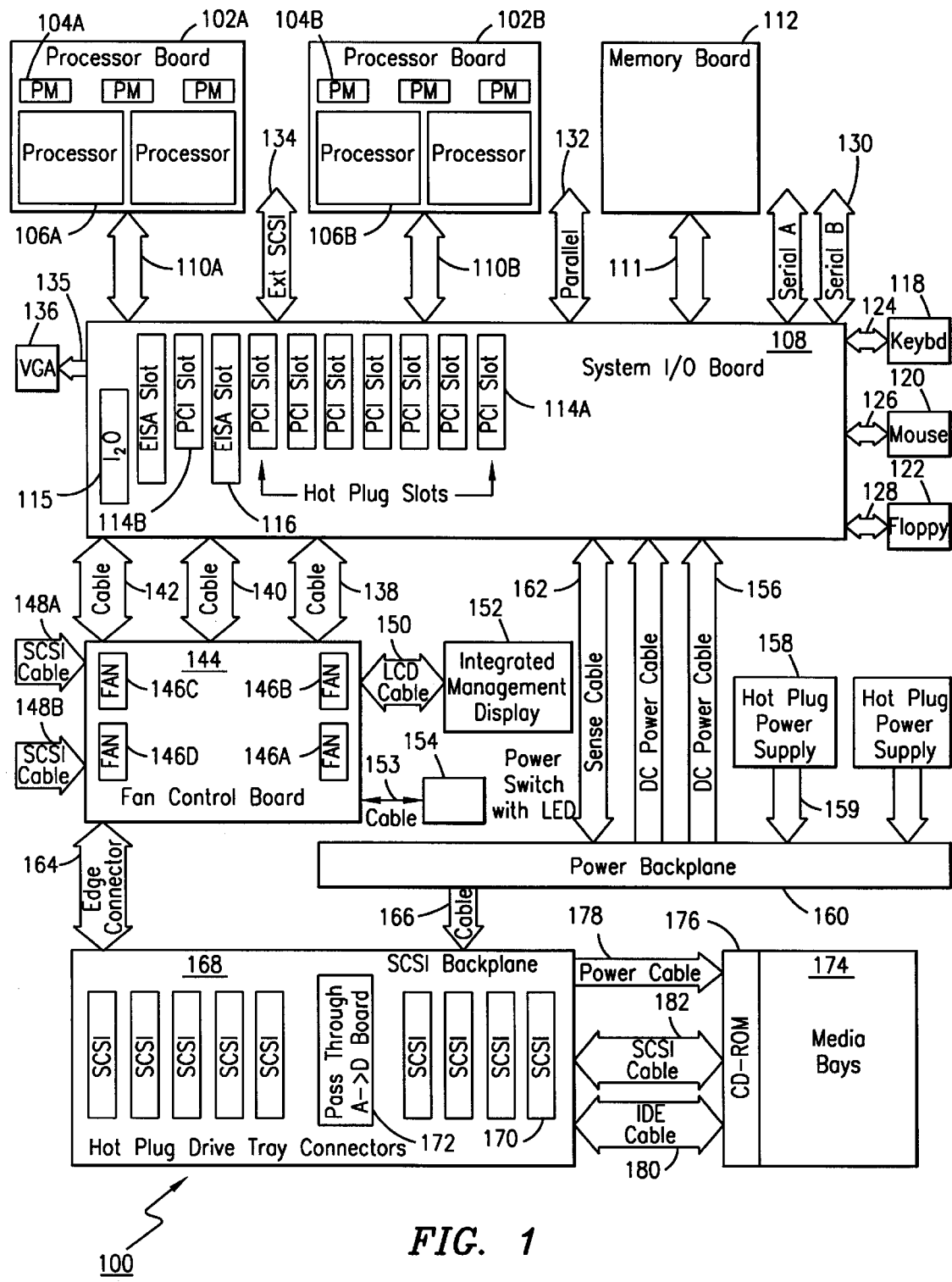
FIG. 1 is a board level block diagram of an exemplary computer system.

DETAILED DESCRIPTION OF THE PREFERRED EXEMPLARY EMBODIMENTS OF THE PRESENT INVENTION

Referring now to the drawings, like or similar elements are designated with identical reference numerals throughout the several views, and the various elements depicted are not necessarily drawn to scale. In particular, in FIG. 1, there is shown a board-level block diagram of a presently preferred exemplary computer system 100 in which the teachings of the present invention may be beneficially employed. It should be understood by those skilled in the art that while the exemplary computer system 100 is preferably organized as a zero downtime, highly available, high-end server system, the present invention may be practiced in virtually all types of computers.

The exemplary computer system 100 may comprise a plurality of processor boards, for example, processor boards 102A and 102B, each of which, in turn, may include at least one processor such as, for example, processors 106A and 106B, respectively. The processor boards 102A and 102B may also include, respectively, a plurality of power modules. For example, power modules 104A and 104B are shown herein.

Each of the processor boards 102A and 102B is connected to a system board 108 via a suitable bus connector or slot, for example, bus connector slots 110A and 110B, respectively. In the exemplary computer system 100, the presently preferred bus connector slots are compatible to be operable with the Gunning Transistor Logic (GTL) bus protocol. Furthermore, as will be seen hereinbelow, the system board 108 in the exemplary embodiment also contains a plurality of input/output (I/O) subsystems. Accordingly, the system board 108 may also be interchangeably referred to as the system I/O board.

Continuing to refer to FIG. 1, a memory board 112 is also coupled to the system board 108 through a memory connection slot 111. In the exemplary computer system 100, the memory board 112 may comprise several dual in-line memory modules (DIMMs) having known sizes, for example, 8 MB, 16 MB, 32 MB, 64 MB, 128 MB, and 256 MB. As can be appreciated by those skilled in the art, the memory provided with the memory board 112 may be organized in any known fashion.

The exemplary system board 108 comprises a plurality of expansion slots, suitable for different bus types. Further, these expansion slots may be selectively provided with "hot-pluggable" capability. One of ordinary skill in the art can readily appreciate that the ability to replace an expansion card (not shown), receivable at an expansion slot, without powering down the system 100 contributes to rendering the system 100 a "zero downtime" system with high availability. In the exemplary computer system 100, the plurality of expansion slots comprises those that may be operable with the Peripheral Component Interconnect (PCI) bus type (for example, slots 114A and 114B) as well as those slots that are compatible with the Extended Industry Standard Architecture (EISA) bus type (for example, slot 116). It should be appreciated that either categories of the expansion slots may be provided with hot-pluggability. The system board 108 may additionally comprise serial port connections, for example, serial connector 130, parallel port connection, for example, parallel connector 132, and a connector 134 compatible with the Small Computer System Interface (SCSI) bus type.

Still continuing to refer to FIG. 1, the system board 108 is coupled to a host of input and output devices via cables, for example, a keyboard 118 with cable 124, a pointing device 120 with cable 126, a flexible disk drive 122 with 128, and a monitor 136 with cable 135. As can be seen, a separate power connection path 121 is also provided between the flexible disk drive 122 and the system board 108.

The exemplary system board 108 may also comprise an "intelligent I/O" bus connector 115 for accelerating the performance of selected PCI-compatible expansion slots. A fan control board 144 is coupled to the system board 108 through a SCSI cable 142, a miscellaneous cable 140 and an Integrated Drive Electronics (IDE) cable. The fan control board 144 comprises a plurality of fan connectors, for example, fan connector 146A–146D, which fan connectors are used for coupling hot-pluggable fans. The fan control board 144 may be provided with additional SCSI-compatible cables, for example, cables 148A and 148B, a display cable 150 coupled to an integrated management display (IMD) unit 152, and a power switch cable 153 coupled to a power switch 154.

The miscellaneous cable connector 140, which joins the fan control board 144 with the system board 108, preferably contains signals generated by the IMD unit 152, various interlock signals provided by an interlock cabling system (not shown) interconnecting various boards, temperature signals, fan control signals, audio signals, et cetera.

The system board 108 of the exemplary computer system 100 is coupled to a power backplane 160 via a sense cable 162 and at least one DC power cable 156. At least one hot-plug power supply unit 158 is connected to the power backplane 160 through a hot-plug power connector 159. Both the fan control board 144 and the power backplane 160 are coupled to a SCSI backplane 168 via an edge connector 164 and a power-SCSI backplane cable 166, respectively. The SCSI backplane comprises a plurality of SCSI drive tray connectors, for example tray connector 170. In the exemplary computer system 100, the SCSI drive tray connectors are also provided with the hot-plug capability in order to enhance the high availability aspect thereof. A media power cable 178 connects the SCSI backplane 168 to a media bay 174 and CD-ROM drive 176. A media SCSI cable 182 and an IDE cable 180 are also disposed between the SCSI backplane and the CD-ROM/media bay 176/174.

Prior to the present invention a computer system may have had included, for example, a processor card that connected to or plugged into a I/O card. A concern arose about not being able to determine if the processor card was seated correctly in the I/O board connector. If the processor card was not seated correctly it could be possible that incompatible signal lines could be connected incorrectly or touch inadvertently and potentially damage circuitry on one or more circuit boards. Furthermore, if power traces or lines mistakenly touch other traces or lines in the computer circuitry then devices and components could be damaged resulting in the computer system requiring an unwanted shutdown. Thus, an exemplary embodiment of the present invention requires that power be unavailable if it is determined that a circuit card is not seated or connected properly to the computer system.

Figure 2:
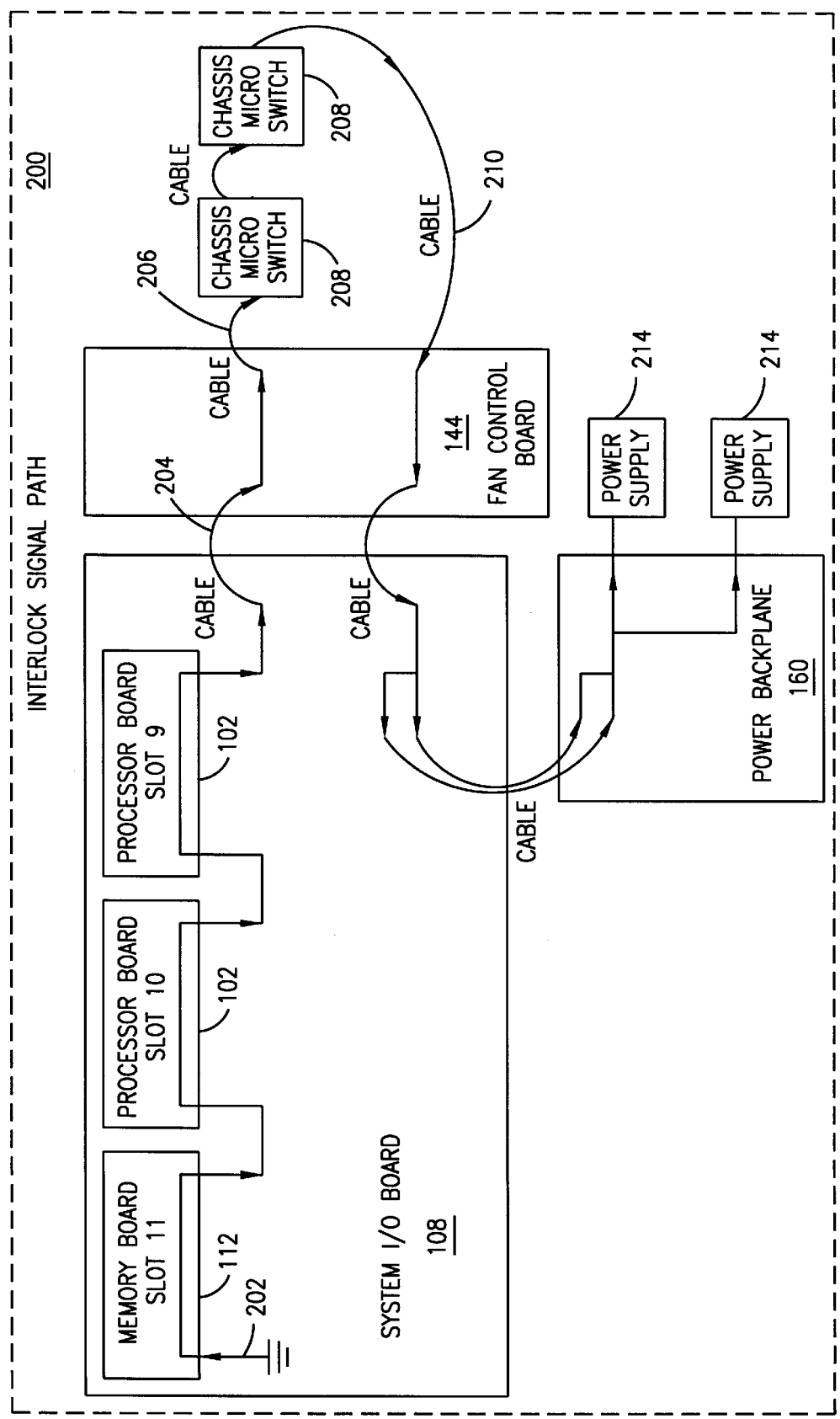
FIG. 2 a board level block diagram of an exemplary interlock signal path.

Referring to FIG. 2, to implement the present interlock system in the exemplary computer system 200, a grounded wire 202 is routed from the system I/O board to the memory board 112 then back to the system I/O board 108. The wire is then routed to a first processor board 102 and them back to the system I/O board 108. The wire continues to a second processor board 102 and then back to the system I/O board 108. The wire continues, via a cable 204 to the fan control board 144. The wire leaves the fan control board 144 via another cable 206 and is routed through multiple micro-switches 208. The micro-switches 208 are attached to doors and/or access panels (not shown) connected to the chassis of the computer system. When the access panels or doors are closed the micro-switches 208 are closed. In essence, the micro-switches 208 indicate whether any chassis access panels are open.

The wire continues, via a cable 210, back to the fan controller board 144. Then the wire 202 continues from the fan controller board 144 back to the system I/O board 108. From the system I/O board 108 the wire 202 is connected via a cable 212 to the power backplane 160. Two hot-pluggable power supplies 214 are connected to the power backplane 160. One of the power supplies 214 is a primary power supply and the other power supply is a redundant power supply. Each power supply is connected to the wire 202.

A control circuit, not shown in this picture, is connected to the wire 202. The control circuit monitors the wire 202 and is capable of determining whether the wire 202 is connected to ground or whether there is a break in the routing of the wire. The various connections and boards that the serially routed wire propagates through are generally critical circuit boards and or cables that must be connected properly in order for the computer system 200 to function correctly. The control circuit is connected to the power supplies 214 and provides an interlock signal to the power supplies 214 indicating whether there is a break in the serially routed wire 202.

Upon receipt of an interlock signal the power supplies 214 turn off their main power outputs, but continue to provide auxiliary power. The auxiliary power is preferably a 5 volt trickle of power which can be used by the computer system to operate some minor system trouble shooting related and display circuitry. The trouble shooting circuitry aides a user who is servicing the computer system to determine which connection of the many circuit boards and connectors is the connection that is not properly seated. The trouble shooting circuitry makes the present computer system easier to service and may decrease the amount of time required to repair the computer system.

Figure 3:
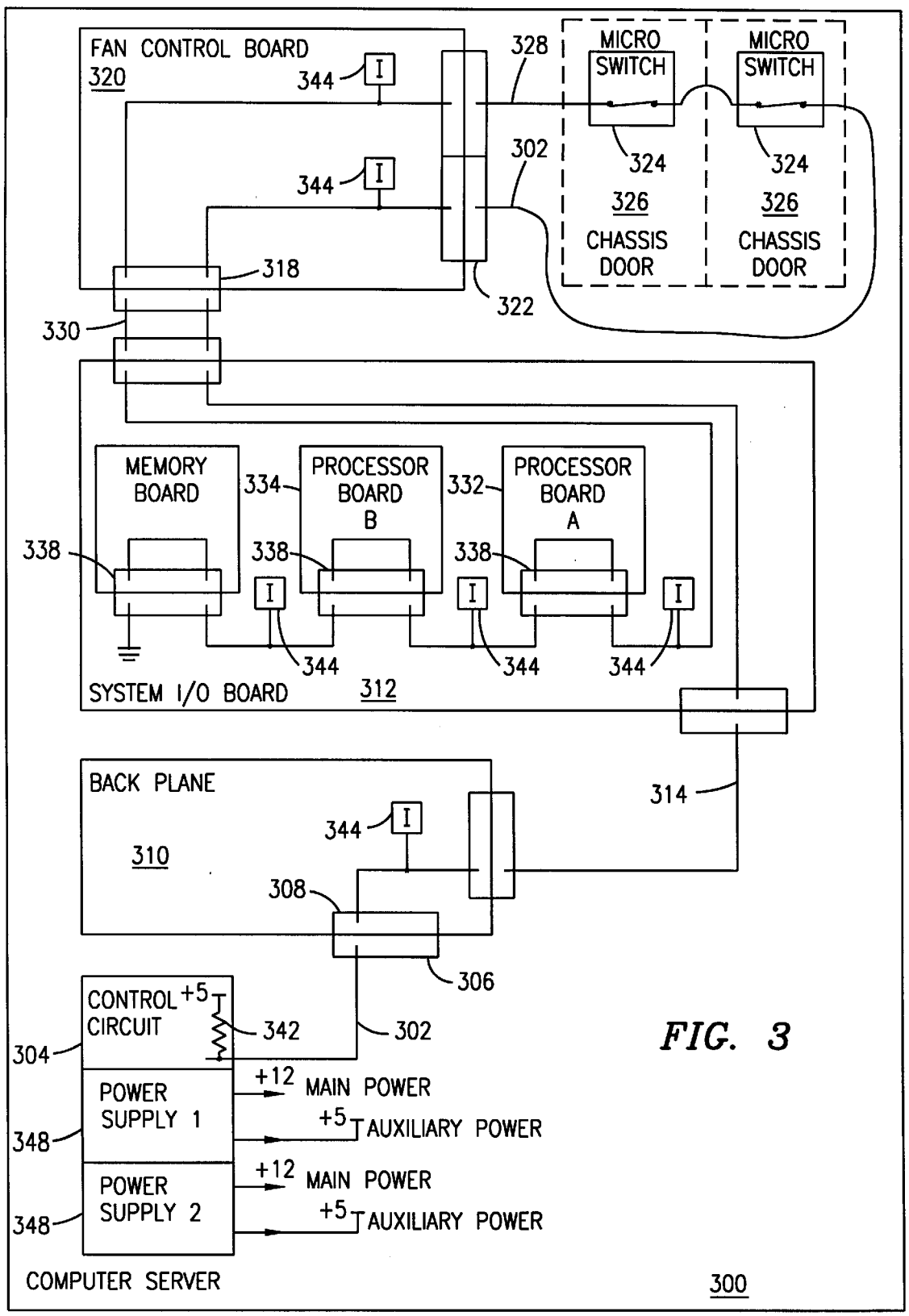
FIG. 3 is a more detailed board level block diagram of an exemplary interlock signal path.

Referring now to FIG. 3, there is depicted a more detailed drawing of a preferred computer system 300. An interlock conductor 302 is serially connected starting at a control circuit 304. The interlock conductor 302 preferably travels through the power connector 306 to the power backplane connector 308, through a portion of the power backplane 310 and then to the system I/O board 312 via the DC power cable 314. From the system I/O board 312 the interlock conductor 302 goes through the miscellaneous cable 330 and the miscellaneous cable connectors 318 to the fan control board 320. The interlock conductor 302 is routed through another connector 322 and through a couple of microswitches that are associated with access doors 326 on the exterior of the computer chassis which provide a user access to the electronics of the computer system 300. The interlock conductor 302 is then routed back to the fan controller board 320 via another cable 328, through a portion of the fan controller board 320 and then back to the system I/O board 312 via a miscellaneous cable 330 and its associated connectors 318. Note that the interlock conductor could connect between the fan controller board 320 and the system I/O board via different cable as well.

On the I/O board 312 the interlock conductor 302 is routed onto and off of a first processor board 332, a second processor board 334 and a memory board 336. The interlock conductor 302 is preferably routed onto each of these circuit cards via the board edge connector 338 where the circuit cards connect to the I/O board 312. The interlock conductor 302 is routed through pins on the connectors that are preferably on opposing distal sides of the connector 338. By routing the interlock conductor 302 on pins located on opposing sides of the connectors 338, the interlock conductor 302 will have an "open" connection if either side of the connector is not seated properly.

The interlock conductor 302 is grounded 340 after being routed off the memory board 338. Thus, if all the connectors associated with the various cables and circuit cards are properly seated and connected, the interlock conductor 302 will be pulled to ground potential. Note that the interlock conductor is connected, via a resistance 342, to +5 volts (auxiliary power). Furthermore, at locations throughout the routing of the interlock conductor 302 there are indicator lights 344 which preferably remain off if the interlock conductor 302 is grounded 340 and will turn on if the interlock conductor 302 is not being pulled to ground. At each indicator light position the interlock conductor is connected via resistance 405 to 5 volts (auxiliary power). This is a weak pull-up to insure that the indicator will turn on when a connection is not seated properly. For example, if processor board A 332 is not connected or seated correctly in its associated system I/O connector 338 then the indictor lights 344 between processor board A 332 and the control circuit 304 will be on because the interlock conductor 302 is being pulled high by the +5 volts connection (auxiliary power) at the control circuit 304 and/or via the weak pull-ups 405 located near the indicator. Furthermore, all the indicator lights 344 between the processor board A 332 and the ground connection 340 of the interlock conductor 302 will be off. Preferably, the indicator lights 344 are located on or near the interlock conductor 302 section that the indicator light 344 is connected to. If a user of the system understands the meaning of the indicator lights 344, it becomes a simple task to determine which connections need to be checked to make sure they are seated or connected properly.

Figure 4:
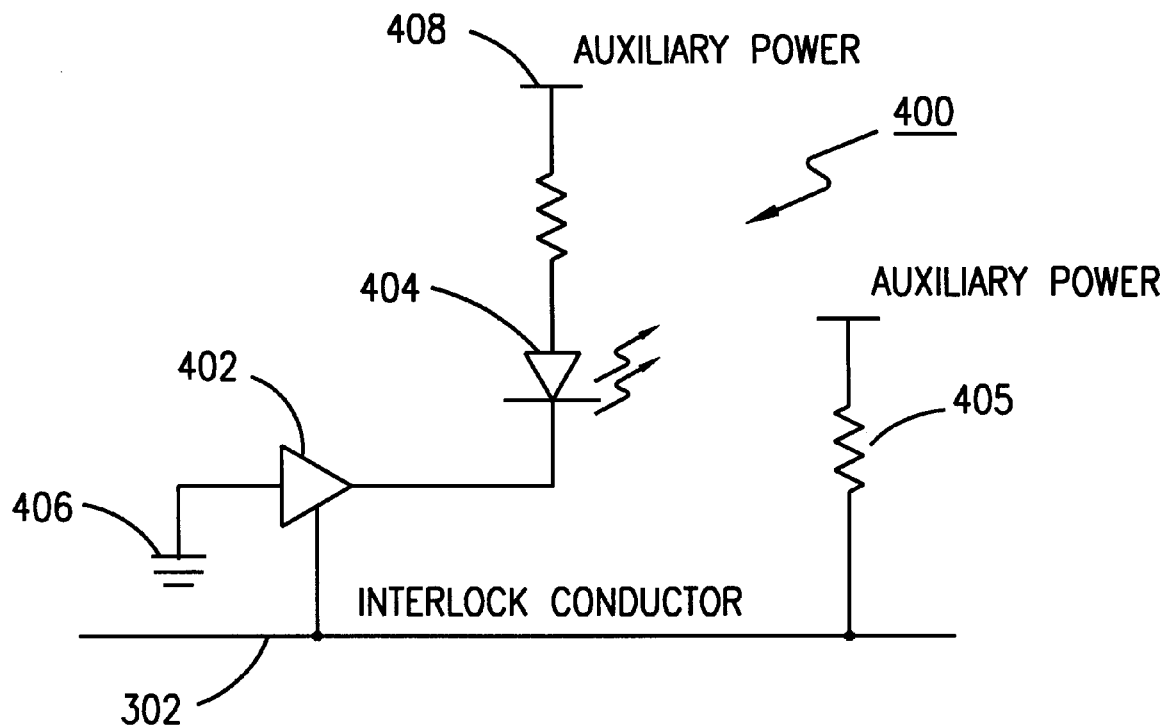
FIG. 4 depicts an exemplary indicator circuit of the present invention.

It would be understood by one of ordinary skill in the art that the circuitry related to the indicator lights 344 can be designed to make the indicator lights either be on or off depending on whether the interlock conductor is pulled to ground or pulled high. FIG. 4 depicts an exemplary indicator light circuit 400. Here, if the interlock conductor 302 is pulled high then the switch 402 is turned on thereby connecting the light emitting diode (LED) 404 to ground 406 (via the switch 402) such that the LED is illuminated. Note that the indicator light circuit 400 is powered by the auxiliary power 408 provided by the power supply. Auxiliary power 408 is on regardless of whether the interlock conductor circuit 302 is complete from the control circuit 304 to ground 340.

If the control circuit 304 senses that the interlock conductor 302 is being pulled high, due to one of the critical connections in the interlock conductor circuit being open, then the control circuit 304 will turn off the main power portion of the power supply(ies) 348 (FIG. 3) or disallow the main power portion of the supply(ies) from turning on. By the power supplies turning off the main power to the computer, then circuitry is protected from potential shorts or incorrect connections of the crucial circuits in the computer system.

Furthermore, the access doors 326 to the computer system are integral to the interlock conductor circuit. When an access door is opened main power to the computer system is turned off, but auxiliary power (+5 volts) is still provided to various circuits within the computer system. By turning off the main power, a user may be protected from shock or dangerous conditions within the computer system while trouble shooting the computer system via circuitry that uses auxiliary power from the power supplies.

As a result of the now explained exemplary embodiment of the present invention, a computer system is made more reliable, user friendly, and serviceable. Furthermore, the downtime of the computer, due to an electronic failure or improper connection, may be shortened. By incorporating the exemplary embodiments of the present power interlock fault detection circuitry and indicator lights with auxiliary trickle power backup into, for example, a computer server system the entire computer server obtains a higher level of fault resiliency than prior devices. On the one hand, the computer system can detect a fault in a critical circuit board or cable connection, stop a shorted connection from damaging circuitry, power down the main power to the computer and indicate where the faulty connection is to a user servicing the computer. As a result the totality of the computer system becomes more reliable and dependable.

Obviously, numerous modifications and variations are possible in view of the teachings above. Accordingly, the present invention is not limited by the embodiments disclosed, but is capable of numerous rearrangements, modifications, and substitutions, without departing from the spirit and scope of the invention as set forth and defined by the following claims.

What is claimed is:

1. A computer system comprising:

a chassis for holding said computer system;

a first circuit card having a first connector for removably connecting said first circuit card to said computer system;

a second circuit card having a second connector for removably connecting said second circuit card to said computer system;

a power supply for supplying power to said first circuit card and to said second circuit card;

a control circuit connected to said power supply for turning off and on at least a portion of said power supply;

an electrical circuit that is serially routed at least from said control circuit, through a first pin on said first connector, onto said first circuit card, back through said first connector on a second pin, through said second connector on a third pin, onto said second circuit card, back through said second connector on a fourth pin and then to ground; and an indicator light connected to said electrical circuit such that if said second connector is not properly connected to said computer system said indicator light will be on, said control circuit capable of turning off said at least a portion of said power supply when said electrical circuit is open.

2. The computer system of claim 1, wherein said control circuit is capable of stopping said at least a portion of said power supply from turning on when said electrical circuit is open.

3. The computer system of claim 1, further comprising a chassis door movably attached to said chassis and a switch, said chassis door closing said switch when said chassis door is closed, said switch being connected in series in said electrical circuit between said ground and said control circuit.

4. The computer system of claim 1, wherein said electrical circuit is pulled high when said electrical circuit is open and wherein said electrical circuit is pulled low when said electrical circuit closed.

5. The computer system of claim 1, wherein said indicator light functions to aid a user determine which of said first circuit card and said second circuit card is not properly connected to said computer system.

6. The computer system of claim 1, wherein said first pin and said second pin on said first connector are positioned at opposing ends of said first connector.

7. A computer system comprising:

a chassis for holding said computer system;

a first circuit card having a first means for connecting said first circuit card to said computer system;

a second circuit card having a second means for connecting said second circuit card to said computer system;

a power supply electrically connected to said first circuit card and said second circuit card, said power supply supplies at least a first voltage to said first circuit card and said second circuit card;

a control circuit connected to said power supply for turning off and on said first voltage;

a serial electrical circuit routed from said control circuit to a first connection pin on said first connecting means, to said first circuit card, to a second pin on said first connecting means, to a third pin on said second connecting means, to said second circuit card, to a fourth pin on said second connecting means, and to a ground connection; and an indicator light connected to said serial electrical circuit such that said indicator light will indicate that said serial electrical circuit is open, said control circuit being connected to said serial circuit and turning off said first voltage when said serial electrical circuit is open.

8. The computer system of claim 7, further comprising a chassis door attached to said chassis and a switch, said chassis closing said switch when said chassis door is closed, said switch being connected in series in said serial electrical circuit.

9. The computer system of claim 7, wherein said serial electrical circuit is pulled low when both said first circuit card is properly connected to said computer system via said first connecting means and said second circuit card is properly connected to said computer system via said second connecting means.

10. The computer system of claim 7, wherein said serial electrical circuit is pulled high when either said first circuit card is not properly connected to said computer system via said first connecting means or said second computer card is not properly connected to said computer system via said second connecting means.

11. The computer system of claim 7, wherein said indicator light comprises a light emitting diode pull-up circuit.

12. The computer system of claim 7, wherein said indicator light functions to aid a user of said computer system to determine which of said first circuit card and said second circuit card is not properly connected to said computer system.

13. The computer system of claim 7, wherein said first pin and said second pin are positioned distally from each other in said first connecting means.

* * * * *